United States Patent [19]
Duck et al.

[11] Patent Number: 5,754,718
[45] Date of Patent: May 19, 1998

[54] HYBRID OPTICAL FILTERING CIRCUIT

[75] Inventors: Gary S. Duck, Nepean; Yihao Cheng, Kanata; Mark Farries, Nepean, all of Canada

[73] Assignee: JDS Fitel Inc., Nepean, Canada

[21] Appl. No.: 701,796

[22] Filed: Aug. 26, 1996

[51] Int. Cl.$^6$ ........................................... G02B 6/32
[52] U.S. Cl. ........................ 385/33; 385/37; 385/102
[58] Field of Search ..................... 385/10, 14, 13, 385/28, 33, 37, 38; 372/6, 27, 64, 96, 102; 250/227.18, 227.23; 356/33, 44, 436, 437

[56] References Cited

U.S. PATENT DOCUMENTS

| | | | |
|---|---|---|---|
| 5,016,967 | 5/1991 | Meltz et al. | 385/37 |
| 5,363,239 | 11/1994 | Mizrahi et al. | 385/10 |
| 5,367,588 | 11/1994 | Hill et al. | 385/14 |
| 5,402,956 | 4/1995 | Dunphy et al. | 250/227.23 |
| 5,428,697 | 6/1995 | Dolfi et al. | 385/4 |
| 5,511,083 | 4/1996 | D'Amato et al. | 372/6 |
| 5,513,913 | 5/1996 | Ball et al. | 356/32 |
| 5,536,304 | 7/1996 | Mizrahi et al. | 385/13 |
| 5,557,665 | 9/1996 | Yamamoto | 379/198 |
| 5,564,832 | 10/1996 | Ball et al. | 385/12 |
| 5,641,956 | 6/1997 | Vengsarkar et al. | 385/28 |
| 5,650,856 | 7/1997 | Morse | 356/436 |

*Primary Examiner*—Akm E. Ullah
*Attorney, Agent, or Firm*—Neil Teitelbaum & Associates

[57] ABSTRACT

A hybrid filter includes a dichroic interference WDM filter closely coupled with a Bragg grating. Preferably the Bragg grating is housed within a sleeve having an end face that is directly coupled with an end face lens of the WDM interference filter. The entire filter can be placed within a single housing and temperature controlled. Etalon effects are lessened by placing the Bragg grating as close as possible to the WDM filter. Multiple hybrid filters of this type optically coupled to an optical circulator provided multi-channel demultiplexing.

15 Claims, 9 Drawing Sheets

Fig. 7

HYBRID OPTICAL FILTERING CIRCUIT

FIELD OF THE INVENTION

The present invention relates to a filter arrangement for use in optical circuits, capable of separating light signals of two or more particular wavelengths from an input light signal having a plurality of wavelengths. The arrangement may be used both for removing unwanted wavelengths from a mixture of wavelengths, or for separating two or more desirable wavelengths from other, undesirable wavelengths. Such arrangements are needed for example in wavelength division multiplexing (WDM) systems for transmitting optical signals of distinct wavelengths through a single optical fibre.

BACKGROUND OF THE INVENTION

WDM Technology

There are several technologies that can be used to construct WDM filters. For example, etalon technology, detraction grading technology, fused biconic taper technology, and holographic filter technology. One technology that has proven to be widely useful in the telecommunications industry is dichroic filter technology. This technology offers wide channel passbands, flat channel passbands, low insertion loss, moderate isolation, low cost, high reliability and field ruggedness, high thermal stability, and moderate filter roll-off characteristics.

Figure 1:
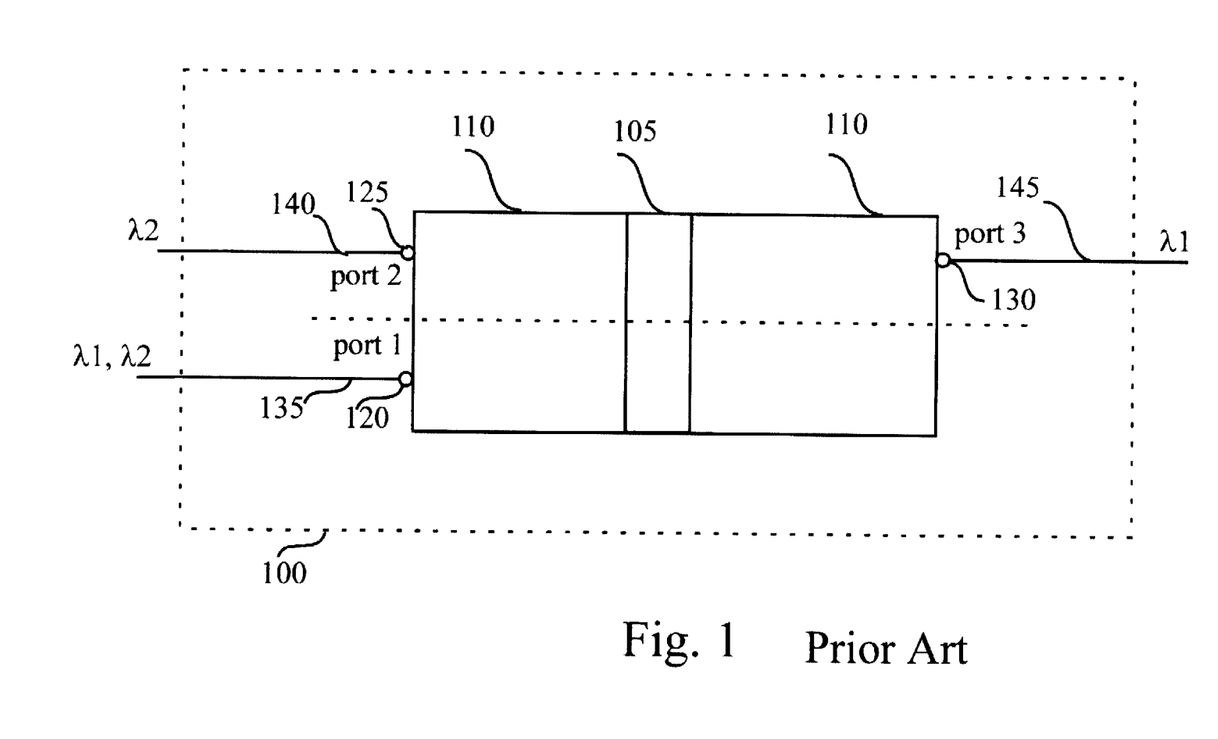
FIG. 1 is a schematic block diagram of a prior art conventional WDM dichroic interference filter.

An illustrative example of a conventional three-port dichroic filter 100 is shown in prior art FIG. 1. A dichroic filter is comprised of one or more layers of dielectric material coated onto a, for example, glass substrate 105 with lenses 110 to focus the incoming and outgoing optical signals. The choice of dielectric material, the number of dielectric layers coated onto the substrate, and the spacing of these layers are chosen to provide the appropriate transmissive and reflective properties for a given-target-wavelength. For example, if $\lambda 1$ is the target wavelength to be transmitted through the filter, the number and spacing of the dielectric layers on the substrate 105 would be chosen to provide (1) a specified passband tolerance around $\lambda 1$ and (2) the necessary isolation requirements for all other transmitted wavelengths, for example, a wavelength, $\lambda 2$, transmitted by a second transmitter.

The dichroic, or WDM, filter is constructed by placing self-focusing lenses, such as "SELFOC" lenses 110, on either side of the dielectric substrate 105. "SELFOC" lens 110 focuses incoming light ($\lambda 1$ and $\lambda 2$) to a particular location on the dielectric substrate.

Attached to the "SELFOC" lenses through an adhesive bonding process are, typically, single-mode optical fibers. For convenience, the locations at which optical fibers attach to the "SELFOC" lenses 110 are called ports: port 1 120, port 2 125, and port 3 130. Connected to the ports are optical fibers 135, 140, and 145 respectively.

For example, all of the light (comprised of $\lambda 1$ and $\lambda 2$) passing through fiber 135 connected to port 1 120 is focused by lens 110 to a single location on the dielectric substrate 105.

Since the substrate is coated to pass wavelengths around $\lambda 1$, virtually all of the light at $\lambda 1$ passes through the dielectric substrate 105 and, via the second "SELFOC" lens, is collimated into port 3 130, and passes away from the filter on optical fiber 145. Ideally, any other wavelength incident on the filter through port 1 120 (e.g., light of wavelength $\lambda 2$) is reflected off the multilayer substrate, focused back through the first "SELFOC" lens to port 2 125, and passes away from the filter on optical fiber 140. Likewise, the filter performs the same function for light traveling in the opposite direction.

Conventional dichroic interference filters such as bandpass filters described heretofore, designed to allow wavelengths within a predetermined range of the desired passband to be transmitted, while a range of wavelengths on either side of the pass band are highly reflected, are in some instances inadequate in their response and their ability to provide suitable isolation. In order to ensure complete channel separation between closely spaced channels, preferably a bandpass filter should be square in its response; thus the transition from the rejection regions to the passband should be as rapid as possible, or expressed differently, the slope or transition region should be as steep as possible while obtaining a pass band region that is uniform.

Bragg Grating Filter Technology

Various constructions of optical filters are known. So-called Bragg filters are gaining popularity. One type of a Bragg filter, is incorporated or embedded in the core of an optical fiber by a method disclosed, for instance, in U.S. Pat. No. 4,807,850. As is discussed in this patent permanent periodic gratings of this kind can be provided or impressed in the core of an optical fibre by exposing the core through the cladding to the interference pattern of two coherent beams of ultraviolet light that are directed against the optical fibre symmetrically to a plane normal to the fiber axis. This results in a situation where the material of the fiber core has permanent periodic variations in its refractive index impressed therein by the action of the interfering ultraviolet light beams thereon, with the individual grating elements (i.e. the periodically repetitive regions of the core exhibiting the same refractive index behavior) being oriented normal to the fiber axis so as to constitute the Bragg grating. The embedded Bragg grating of this kind reflects the light launched into the fiber core for guided propagation therein, in a propagation direction; only that light having a wavelength within a very narrow range dependent on the grating element periodicity is reflected back along the fibre axis opposite to the original propagation direction, while being substantially transparent to light at wavelengths outside the aforementioned narrow band so that it does not adversely affect the further propagation of such other light. In effect, this type of grating creates a narrow notch in the transmission spectrum, and by the same token a similarly narrow peak in the reflection spectrum.

It is an object of this invention to provide a hybrid filter which is based on both dichroic filter and Bragg filter technology.

It is a further object of the invention to provide a filter device having more than 2 ports and which has relatively steep transitions in its output response.

It is a further object of the invention to provide a hybrid filter which essentially obviates or lessens etalon effects often associated with juxtaposed reflective surfaces in optical devices.

It is a further object of the invention to provide a hybrid filter which can be placed in a single package and which can be temperature controlled by a single circuit.

SUMMARY OF THE INVENTION

In a preferred embodiment of this invention the aforementioned inherent problems associated with using conventional WDM interference dichroic filters is somewhat overcome by utilizing a Bragg optical fiber grating in combination with a WDM interference filter. Of course other forms of waveguides may be envisaged. It is generally known that dichroic filters offer reasonably high isolation on transmission but, lower and often unacceptable levels of isolation on reflection. In an amplification system this poor isolation can critically effect the performance of the device, where unwanted non-isolated signals become amplified. By using Bragg diffraction gratings, that have substantially symmetrical high isolation in reflection and transmission, these potential problems are substantially obviated. Thus, one or more Bragg gratings can be used to further and more effectively filter and shape the slope or transmission region of the WDM filter to provide a steeper output response preventing unwanted wavelengths from being transmitted. A WDM filter can be used to block or pass a relatively broad bandwidth wherein one or more Bragg filters coupled to the WDM filter can be utilized to ensure that the response of the filter combination is steep with sharp transitions between the pass band and the reflected bands.

Although Bragg gratings are becoming nearly ubiquitous components within optical communication systems, their use is limited in being only two port devices. Advantageously, the WDM filter Bragg grating filter hybrid combination in accordance with this invention, provides a much desired, relatively inexpensive, three or more port device with the performance of a Bragg grating, where until now, more expensive Mach Zhender configurations or optical circulator configurations with Bragg gratings have been employed.

In a preferred embodiment of the invention, a Bragg grating is disposed within a holding means conveniently in the form of a sleeve, ferrule or holder which is coupled directly to a conventional WDM filter comprising two graded index lenses. Several substantial advantages arise out of this configuration. Firstly, the Bragg grating disposed within the holder is afforded protection; and, secondly a single compact unit is provided which can be placed into a single housing or package which can be temperature controlled, thereby affording temperature stabilization for both the Bragg filter and the WDM filter utilizing a single circuit. Coupling a Bragg grating close or adjacent to a WDM filter has further advantages. The closer in proximity the Bragg grating is to the WDM filter the longer the period of the reflected light due to any unwanted etalon reflections between the Bragg filter and the WDM filter. Thus, unwanted etalon effects are lessened.

In accordance with the invention a filter is provided wherein a Bragg grating is directly coupled with a conventional WDM filter to provide an at least three port optical device for directing light a according to its wavelength.

In accordance with the invention an optical filter device is provided, comprising: a WDM filter including two graded index lenses having an interference filter disposed therebetween for allowing some wavelengths of light to pass therethrough and preventing others from passing therethrough; and, a Bragg filter coupled directly to an end face of one of the graded index lenses for further filtering some of the light that has passed through the WDM filter.

BRIEF DESCRIPTION OF THE DRAWINGS

Exemplary embodiments of the invention will now be described in accordance with the invention in which.

DETAILED DESCRIPTION

Figures 1A, 2A:
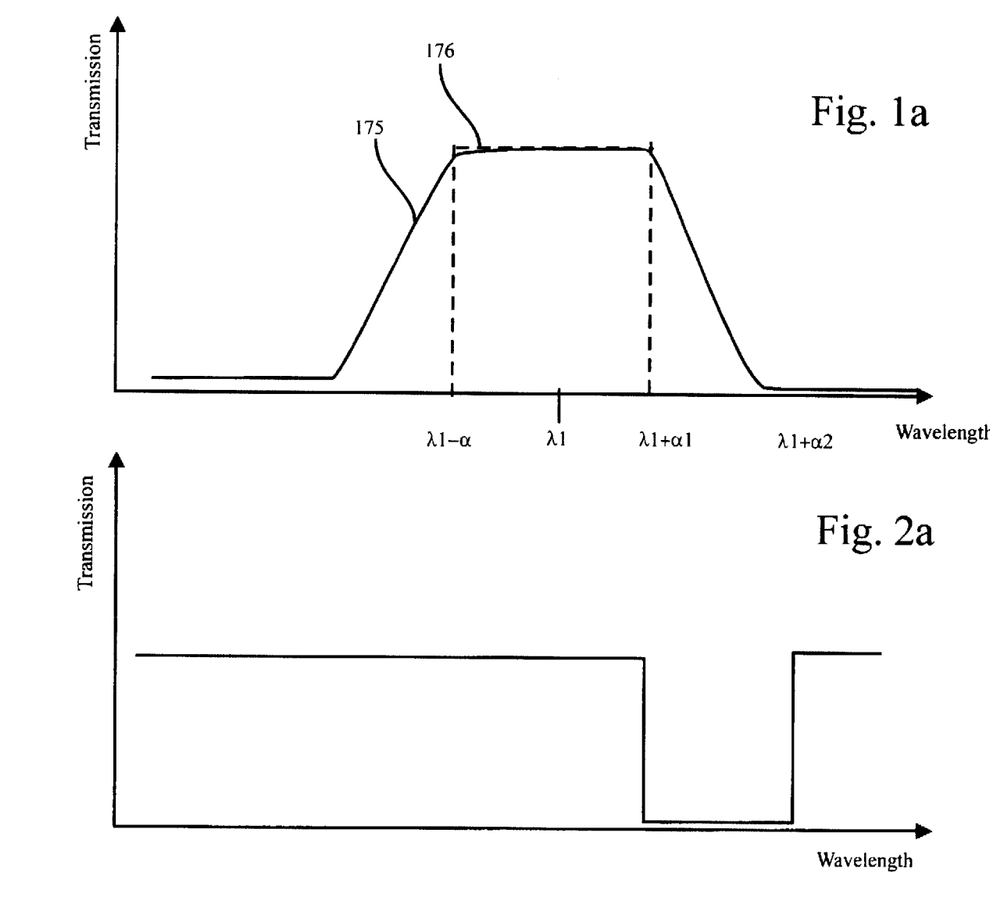
FIG. 1a graph of transmission versus wavelength depicting the output response of the filter shown in FIG. 1
FIG. 2a is a graph of transmission versus wavelength for the Bragg grating shown in FIG. 2.

Referring now to FIG. 1, the WDM filter 100 provides a means for routing wavelengths or channels $\lambda 1$, and $\lambda 2$ launched into port 1 to be directed to ports 3 and 2 respectively. The output response of the WDM filter 100 at port 3 is shown in FIG. 1a and in many instances provides inadequate channel separation. The output response shown in dotted outline 176 is a desired response where the response is solid line 175 is the response of the filter 100.

In an attempt to simplify and clearly describe the operation of the device in the absence of unnecessary detail, reference will be made to only a first optical signal and a second optical signal. Of course the first optical signal referred to can be of wavelength $\lambda 1$ or $\lambda 2$; and, the second optical signal can be of wavelength $\lambda 3$ or $\lambda 4$.

Figure 2:
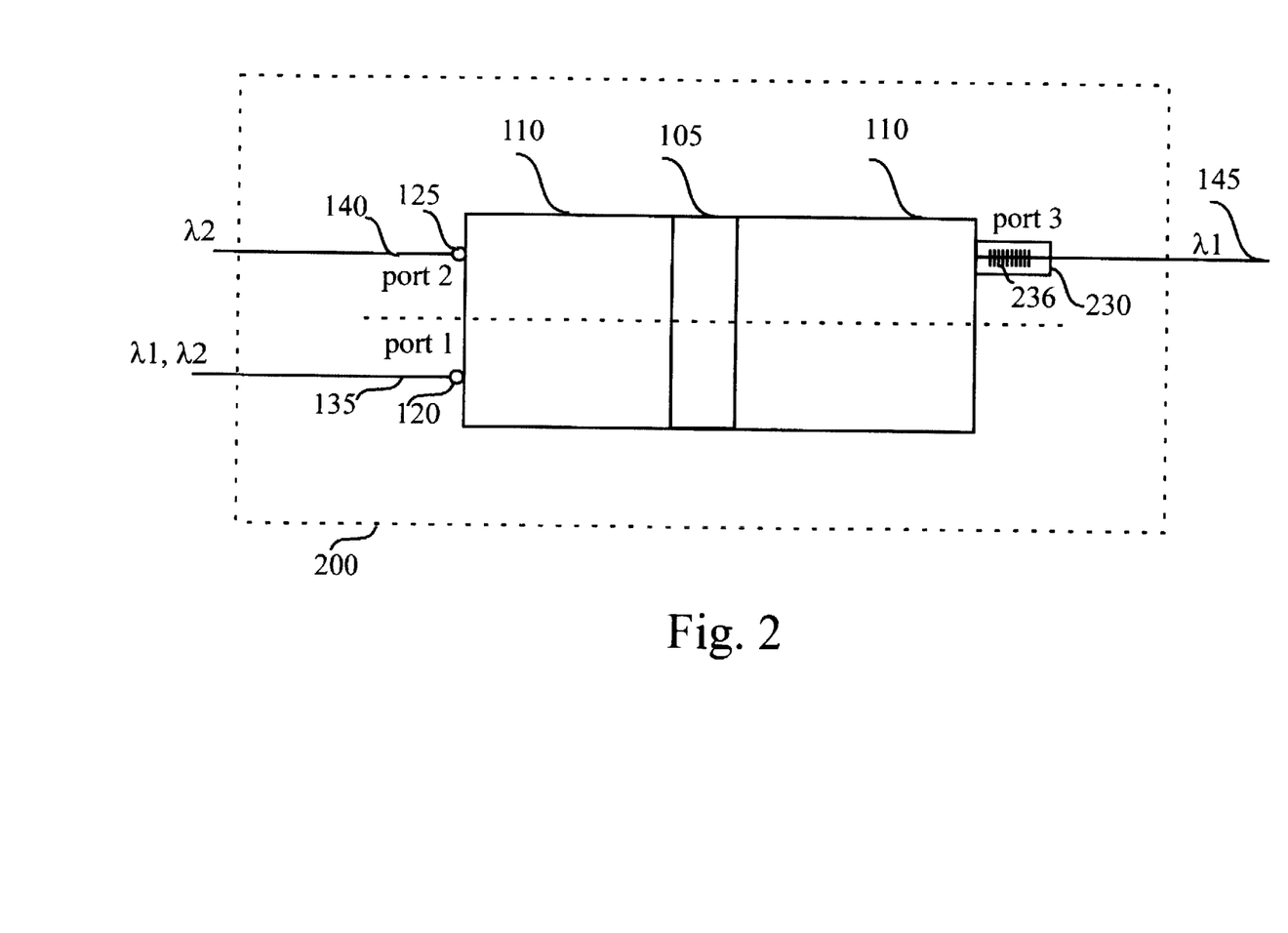
FIG. 2 is a schematic block diagram of a hybrid WDM filter having a dichroic interference filter coupled with a Bragg grating.

FIG. 2 shows a circuit 200 wherein a WDM filter comprising two GRIN lenses 110 and a filter 105 is directly coupled to a chirped Bragg grating 236 housed within a sleeve 230. Preferably the end face of the sleeve 230 is polished for optimum coupling with the lens end face. Chirped Bragg optical fiber gratings are currently in use and have characteristics that are well suited to WDM applications. For example, it possible to design and write a Bragg grating into an optical fiber that is substantially square in response and achieving desired transmissive and reflective characteristics; thus, the transition from the rejection (reflective) regions to the passband (transmission) are as rapid as possible obtaining a pass band region that is substantially uniform. The embodiment of the invention described hereafter utilizes chirped Bragg optical fiber gratings.

Since the filters 105 and 236 are proximate to one another etalon effects are reduced. Furthermore the unitary package in the form of the circuit 200 can be temperature controlled by a single circuit. The operation of the circuit 200 is explained in conjunction with FIG. 2a.

Figure 3:
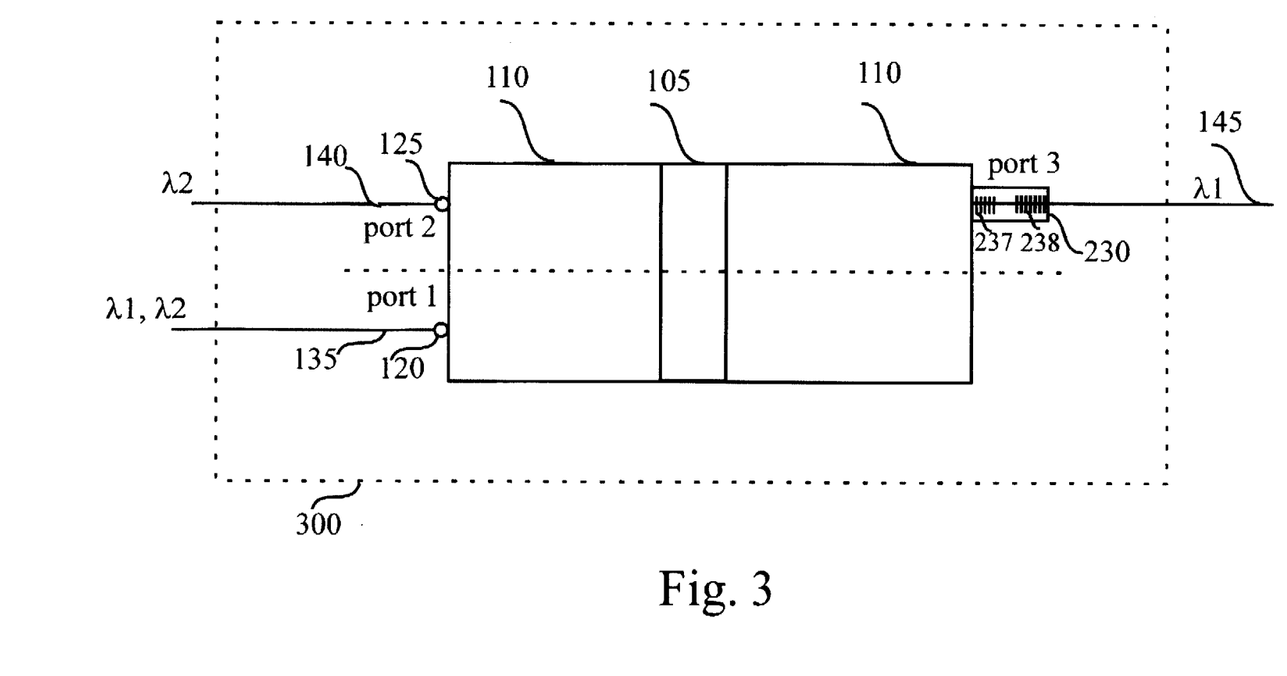
FIG. 3 is a schematic block diagram of a hybrid WDM filter having a dichroic interference filter coupled with two chirped Bragg gratings.

In FIG. 2a the chirped Bragg fiber grating 236 is shown to be a notch filter reflecting wavelengths of light between $\lambda 1+\alpha 1$ to $\lambda 1+\alpha 2$. Wavelengths of light below $\lambda 1+\alpha 1$ are transmitted. By combining the WDM filter and the Bragg filter the output response at or about the wavelength λ1+α1 is greatly improved. The addition of the Bragg filter essentially "sharpens" the edge of the WDM filter. Of course the single grating 236 could be replaced with a pair of gratings 237, 238 shown in the hybrid filter 300 of FIG. 3 with a steep response designed to transmit light above the wavelength λ1−α1 and below λ1+α1.

Figure 2B:
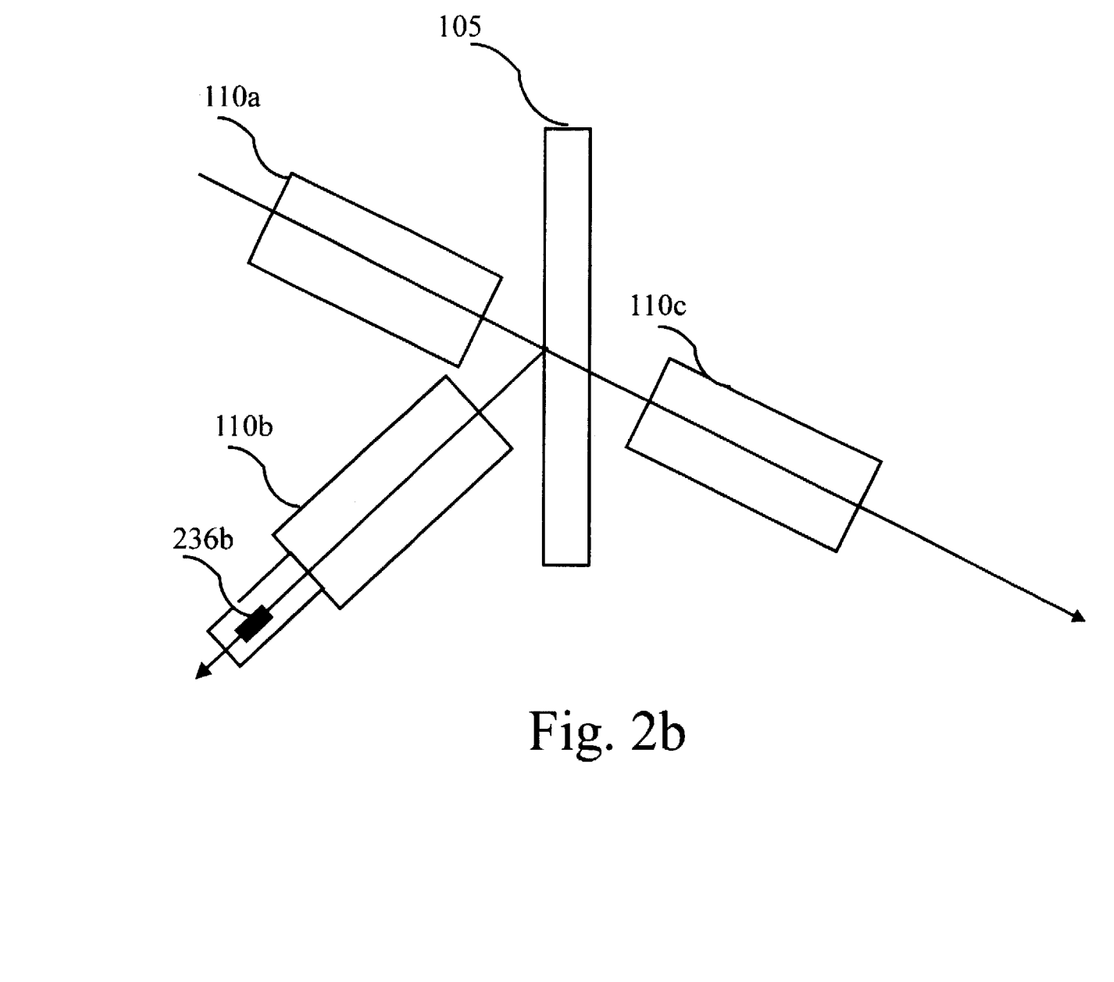
FIG. 2b is a schematic block diagram of an alternative embodiment of a hybrid WDM filter utilizing three graded index lenses and having a dichroic interference filter optically coupled with a Bragg grating.

An alternative embodiment of the hybrid filter in accordance with this invention is shown in FIG. 2b. Light launched into an end of the GRIN lens 110a is divided according to wavelength wherein light of a first predetermined wavelength is reflected off of 105 to GRIN lens 110b. Other wavelengths pass through the filter 105 and are ported out and focused by lens 110c. In this embodiment extra filtering and isolation of light reflected off of 105 passing through lens 110b is provided by a Bragg grating 106 coupled to the lens and contained within a sleeve.

Figure 4:
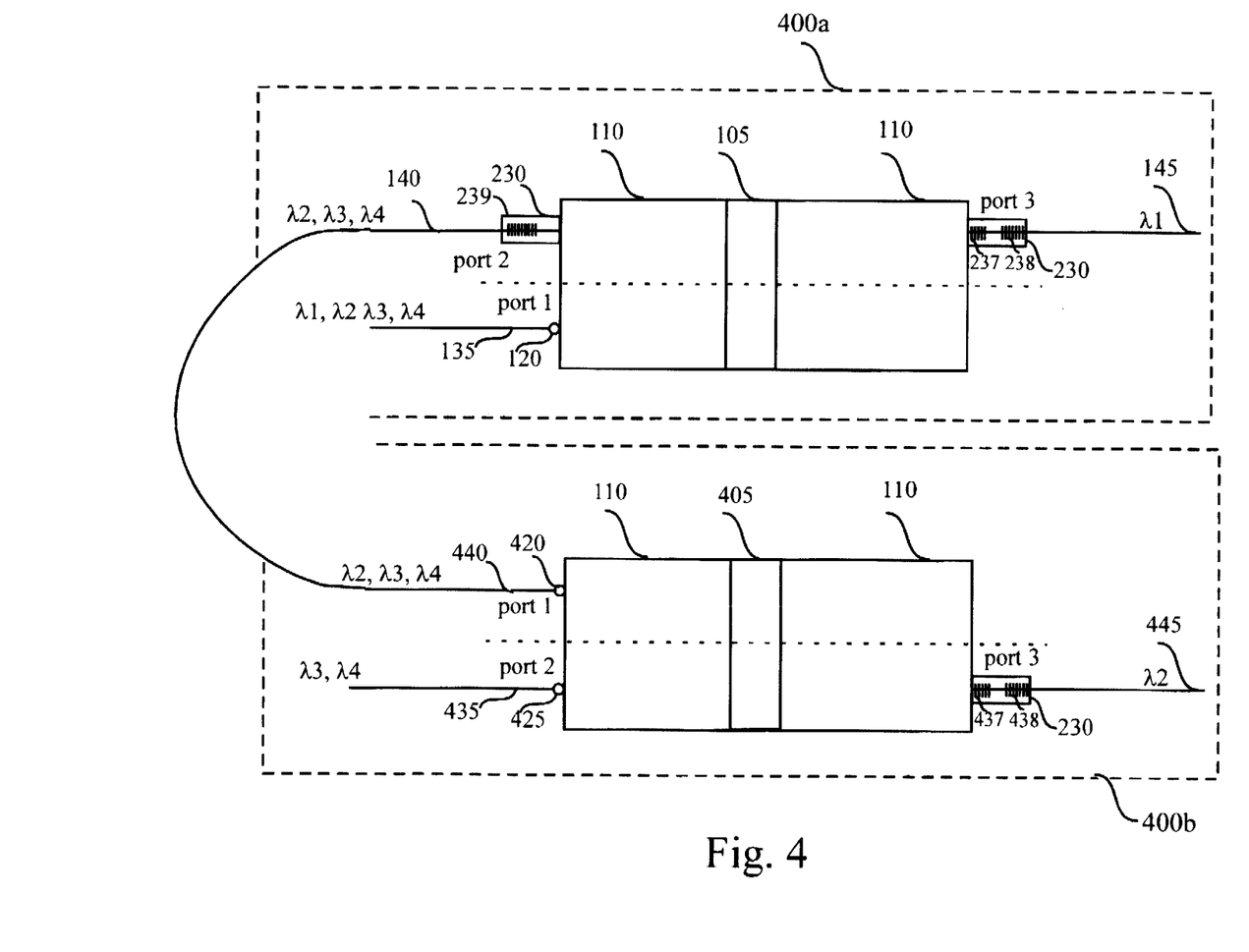
FIG. 4 is a schematic block diagram of to cascaded hybrid filters in accordance with the invention.

Referring now to FIG. 4 two cascaded filters 400a and 400b are shown; input signals λ1, λ2, λ3 and λ4 are launched into an input port 1 120 via optical fibre 134 of the filter 400a. Bragg filters 237 and 238 are provided at output port 3 in a sleeve 230 directly coupled with an end face of the right most GRIN lens 110 of 400a. One or more Bragg filters 239 are provided at output port 2 230 to further filter light reflected by the filter 105 directed to port 2. Filtered light of wavelength λ2, λ3 and λ4 exiting port 2 of filter 400a is directed along fibre 140 to fibre 440 at port 1 420 which serves as an input port for the filter 400b. Light of wavelength λ2 is filtered by the filter 405 and is transmitted to port 3 where it is further filtered by Bragg gratings 437 and 438. Light of wavelength λ3 and λ4 is reflected by the filter 425 to port 2. Further cascading with another filter (not shown) can be provided for separating λ3 and λ4.

Figure 5:
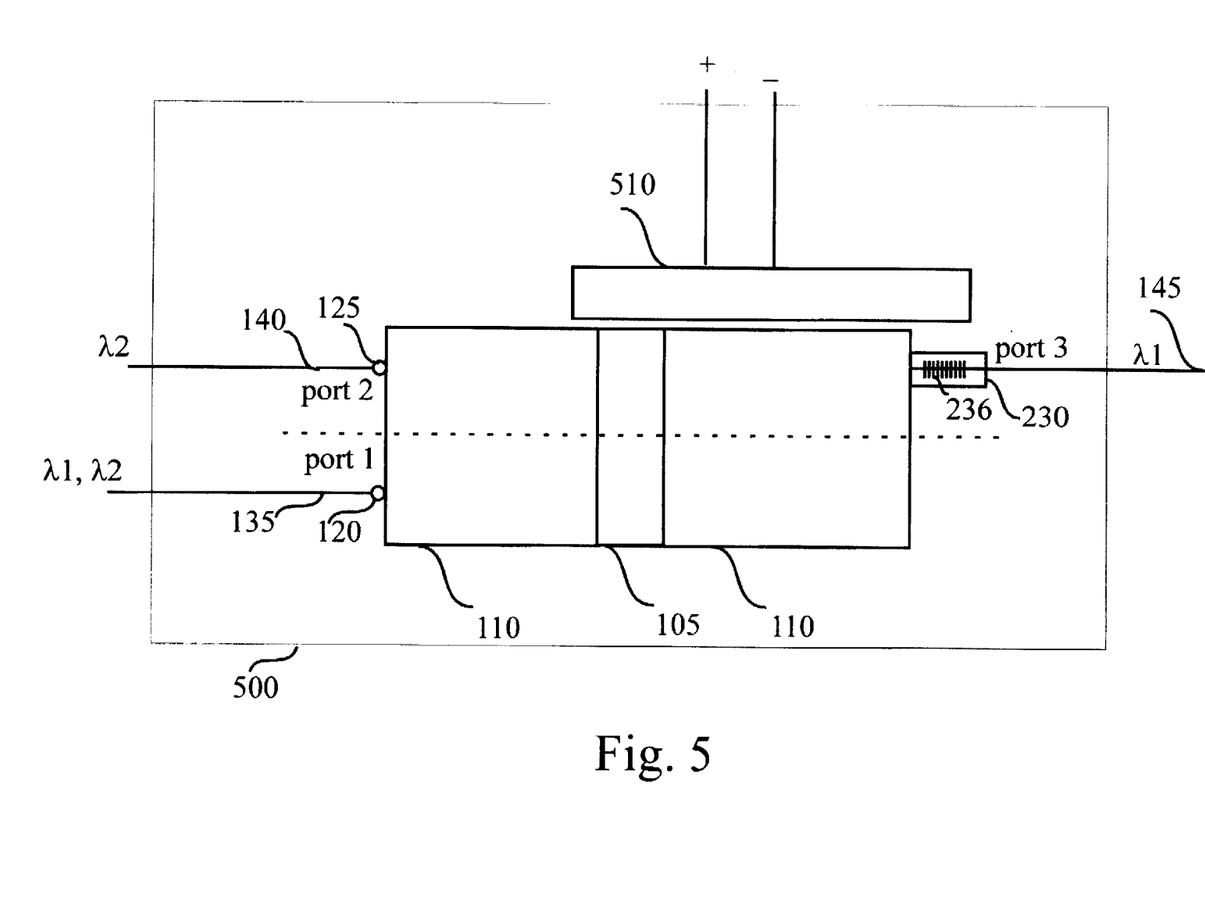
FIG. 5 is a schematic block diagram of a hybrid WDM filter having a dichroic interference filter coupled with a Bragg grating including temperature stabilization circuitry.

Turning now to FIG. 5 an embodiment of the invention is shown having a temperature control circuit 510 for maintaining the device 500 at a relatively constant temperature within predetermined limits. This invention overcomes the 2-port limitations associated with a Bragg grating and the performance limitations of a conventional WDM filter are further overcome. By providing the Bragg grating at or within an output port of a WDM filter, a robust, compact, small high performance optical element wherein temperature control is easily implemented. As well, deleterious unwanted etalon effects are reduced by placing the Bragg grating at or near a distance approximately equal to the length of a quarter pitch GRIN lens away from the dichroic filter.

Figure 6:
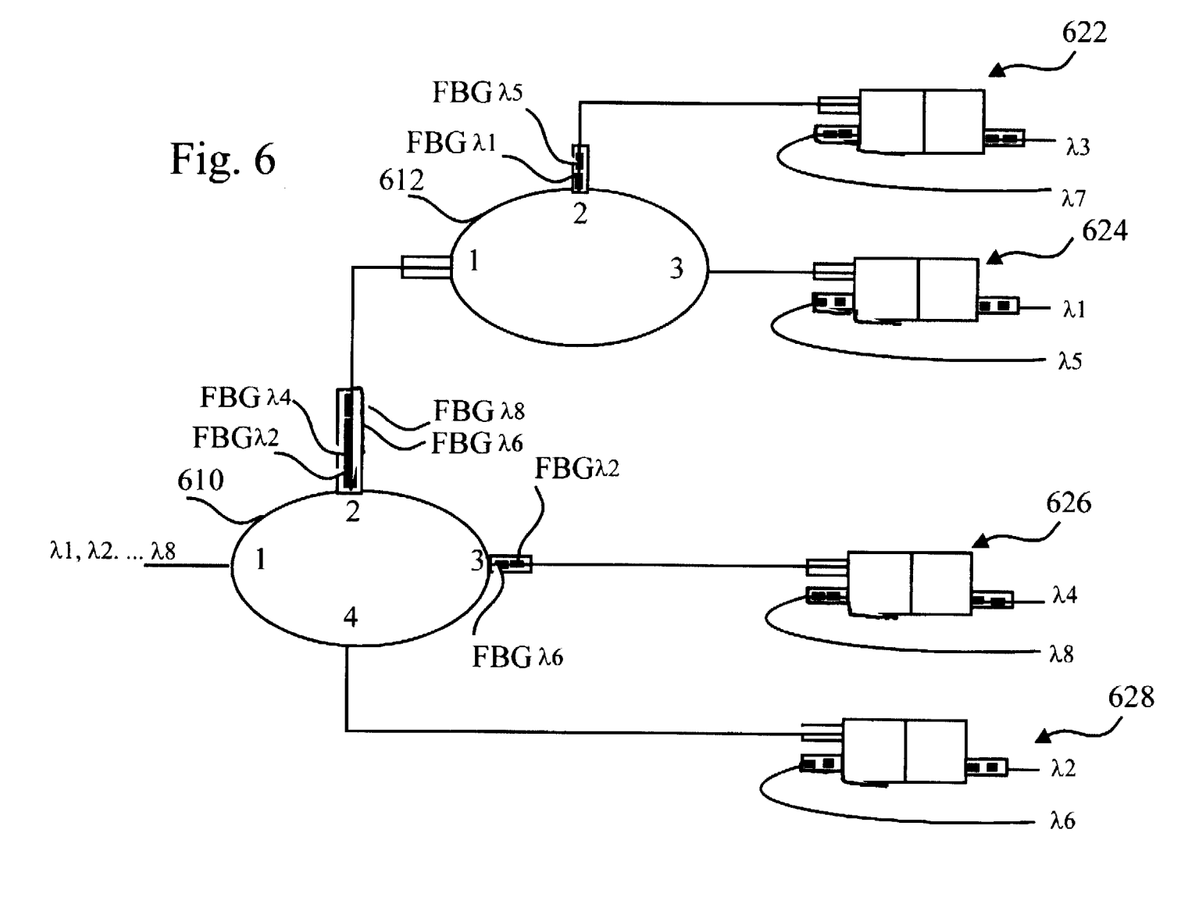
FIG. 6 is a schematic block diagram of an 8 channel demultiplexor circuit.

An eight channel demultiplexor circuit is shown in FIG. 6 comprising a 4-port optical circulator 610 and a 3-port optical circulator 612. Preferably, and in the embodiment shown, Bragg gratings are disposed within holders or sleeves that are coupled to GRIN lenses to achieve the advantages described heretofore. Four hybrid WDM/Bragg filters 622, 624, 626 and 628 are coupled to output ports of the two circulators to achieve demultiplexing of each of the 8 channels. In operation light comprising wavelengths or channels λ1 ... to λ8 is launched into an input optical waveguide 608 which may be in the form of an optical fibre. Light entering port 1 of 610 is circulated to and exits port 2 where Bragg filters FGBλ2, FGBλ4, FGBλ6 and FGBλ8 reflect channels λ2, λ4, λ6, and λ8. Channels λ1, λ3, λ5, and λ7 is passed on to port 1 of the 3-port circulator 612. Bragg filters FGBλ1 and FGBλ5 reflect channels λ1 an λ5 backward an on to port 3 of 612. Channels λ3 and λ5 propagate to the WDM/Bragg hybrid filter 622 where they are demultiplexed in accordance with the teachings heretofore in accordance with this invention. Similarly, channels λ1 an λ5 are launched into filter 624 via port 3 of the circulator 612 and are separated into their channels. A substantially square output signal is provided at output ports of each of the hybrid filters 622, 624, 626, 628 due to the coupling of Bragg gratings with WDM dichroic filters. Channels λ4, λ8, and λ2 and λ6 are also demultiplexed utilizing hybrid filters in accordance with the invention, via ports 3 and 4 respectively of circulator 610.

Figure 7:
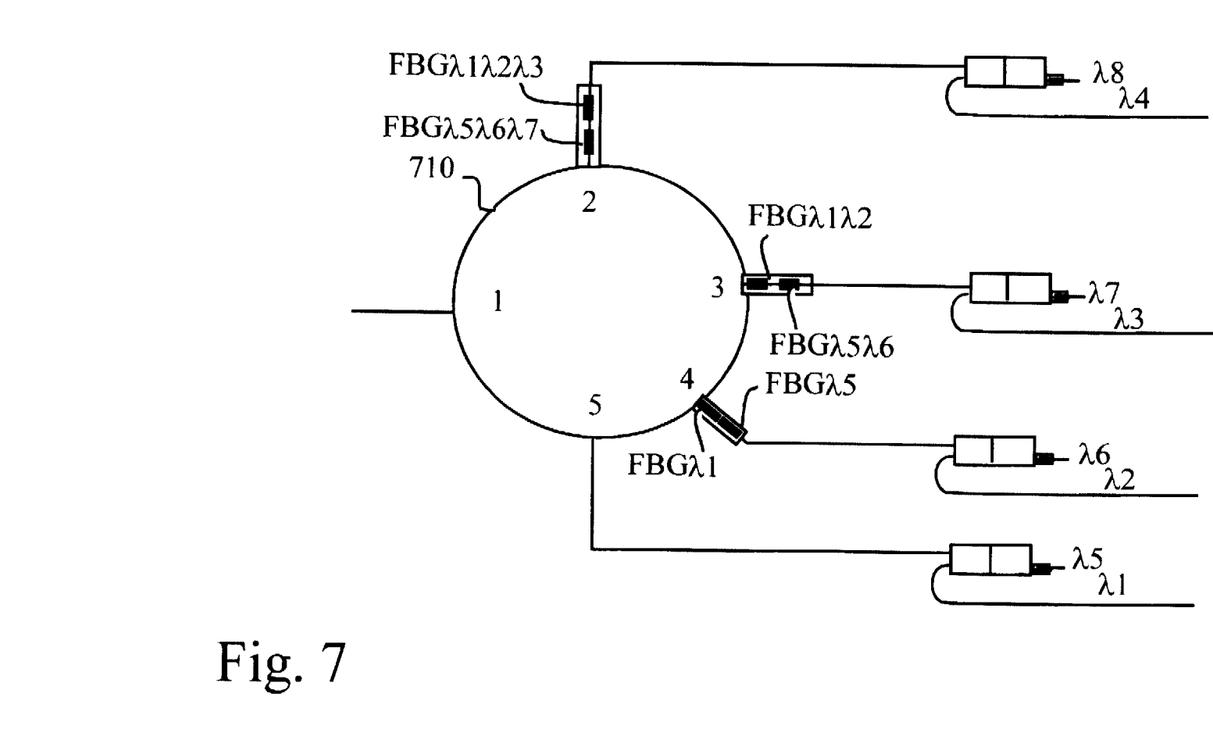
FIG. 7 is a schematic block diagram of an alternative embodiment of an 8 channel demultiplexor circuit in accordance with the invention.

Another embodiment of an 8-channel WDM/Bragg hybrid demultiplexor is shown in FIG. 7 where a single 5-port circulator 710 is used with 5 WDM/Bragg filters. In this embodiment an input signal comprising 8 channels λ1 to λ8 is launched into port one of optical circulator 708. Two chirped Bragg gratings FGBλ123, FGBλ567 coupled to port one of 708 reflect corresponding wavelengths and light λ1, λ2, λ3 and λ5, λ6, λ7 wherein wavelength λ4 and λ8 passes to hybrid filter 722 where it is separated. Light corresponding to channels λ1, λ2, λ3, λ5, λ6, and λ7 circulates to port 2 of the 5-port circulator where it exits. Bragg filters FBGλ1λ2 and FBGλ5λ6 at the output port of port 2 reflect any light of wavelength λ6, λ2, λ5, and λ1 which then circulates to port 4. Bragg gratings FBGλ1 and FBGλ5 at port 4 reflect light of wavelength , λ5, and λ1 which then passes on to the hybrid filter 728 and is separated. Hybrid filters 724 and 726 demultiplex channels λ3 and λ7, and λ2 and λ6 respectively.

Numerous other embodiments may be envisaged without departing from the spirit and scope of the invention.

What we claim is:

1. An optical device comprising:
   an optical fibre having a portion with a Bragg grating therein;
   a holder for holding the Bragg grating, the holder having a coupling end;
   a filter including a lens having an end face optically coupled to the coupling end of the holder.

2. The optical device as defined in claim 1, wherein an air space is provided between the end face of the lens and the coupling end of the holder.

3. The optical device as define in claim 1, wherein the end face of the holder is directly coupled to the end face of the lens.

4. An optical filter device comprising:
   a WDM filter including at least two lenses having an interference filter disposed therebetween for allowing some wavelengths of light to pass therethrough and preventing others from passing therethrough; and,
   a Bragg filter coupled directly to an end face of one of the graded index lenses for further filtering some of the light that has passed through or has reflected from the WDM filter.

5. An optical filter device as defined in claim 4, wherein the at least two lenses are graded index lenses and wherein the filter further including a holder for securing the Bragg filter.

6. An optical filter device as defined in claim 5 wherein the holder comprises a sleeve for protecting the Bragg filter.

7. An optical filter device as defined in claim 6 wherein the sleeve has an end face that is proximate to and physically coupled to an end face of one of the graded index lenses for reducing etalon effects between the Bragg filter and the WDM filter.

8. An optical filter device as defined in claim 7 wherein the Bragg filter and the WDM filter are disposed within a single housing.

9. An optical filter device as defined in claim 8 wherein means for controlling the temperature within the single housing are provided.

10. An optical filter device comprising:

an optical circulator for circulating optical signals from one port to another;

a plurality of hybrid filters coupled to ports of the optical circulator at least some of the hybrid filters including:

two graded index lenses having an interference filter disposed therebetween for allowing some wavelengths of light to pass therethrough and preventing others from passing therethrough; and, a Bragg filter coupled directly to an end face of one of the graded index lenses for further filtering some of the light that has passed through the filter.

11. An optical filter device as defined in claim 10 wherein at least some of the Bragg filters are housed within a sleeve that is directly coupled to an end face of one the graded index lenses.

12. An optical filter device as defined in claim 11, wherein Bragg filters are housed within sleeves directly coupled to at least some ports of the optical circulator.

13. An optical filter device as defined in claim 11 wherein at least two Bragg filters are optically coupled to one port of the optical circulator and wherein one of the at least two Bragg filters have a reflection notch for reflecting and substantially preventing the transmission of a first plurality of wavelengths/channels and wherein an other of the at least two Bragg filters has a reflection notch for reflecting and substantially preventing the transmission of a second plurality of other wavelengths/channels, and wherein at least one wavelength/channel between the first and second plurality of wavelengths/channels is transmitted by the at least two Bragg filters.

14. An optical device as defined in claim 1 wherein the holder housing the Bragg grating, and the filter are disposed within a single housing.

15. An optical device as defined in claim 14 further including temperature control means within the housing.

* * * * *